Figure 1:
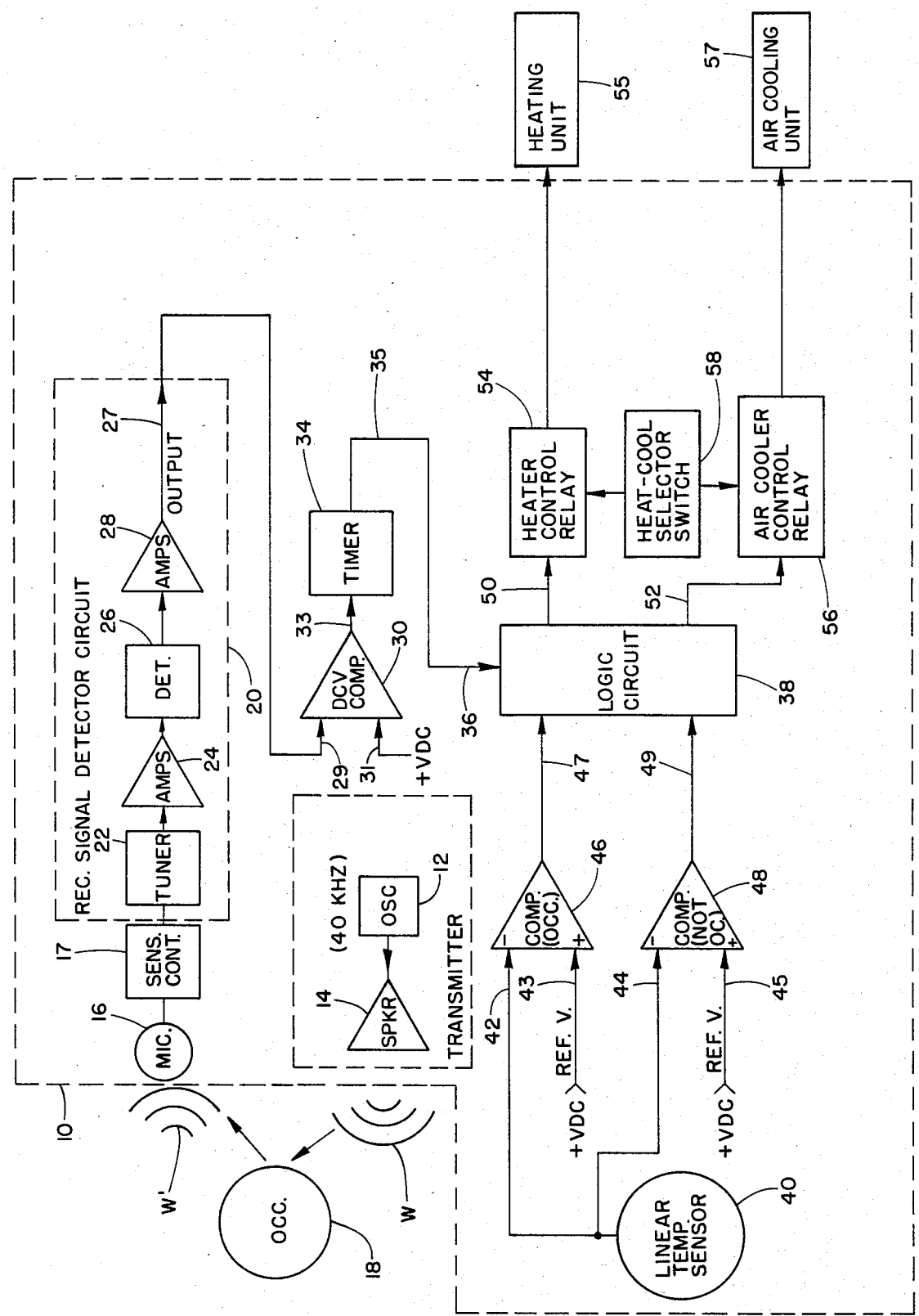

United States Patent [19]
Rossi et al.

[11] Patent Number: 4,505,426
[45] Date of Patent: Mar. 19, 1985

[54] ROOM TEMPERATURE CONTROL SYSTEM RESPONSIVE TO MOVEMENT BY OCCUPANT AND TO AMBIENT TEMPERATURE

[75] Inventors: Vince Rossi, W. Babylon; James R. Miller, Huntington; Leonard P. Tetrault; Robert R. Tripodi, both of Northport, all of N.Y.

[73] Assignee: Censor Electronics, Inc., Bay Shore, N.Y.

[21] Appl. No.: 577,080

[22] Filed: Feb. 6, 1984

[51] Int. Cl.³ .............................................. G05D 23/00
[52] U.S. Cl. ........................................ 236/47; 165/26
[58] Field of Search .................. 165/26, 11; 236/47

[56] References Cited

U.S. PATENT DOCUMENTS

| | | | |
|---|---|---|---|
| 3,815,815 | 6/1974 | Sapir | 165/26 X |
| 3,844,475 | 10/1974 | Kesterson et al. | 236/1 E |
| 4,083,397 | 4/1978 | Kimpel et al. | 165/26 |
| 4,318,508 | 3/1982 | Glasgow et al. | 165/11 R |

Primary Examiner—William E. Wayner
Attorney, Agent, or Firm—Edward H. Loveman

[57] ABSTRACT

In this system, a receiver having adjustable sensitivity to movement by a room occupant picks up continuously generated compressional waves of ultrasonic frequency reflected from the occupant. Movements of the occupant cause changes in frequency of the reflected wave which are detected, and pulses are applied to a timer which applies a timed voltage to a logic circuit. A signal indicating a difference between a preset ambient temperature and that sensed by an electronic sensor is applied to the logic circuit. The logic circuit is arranged to actuate relays to turn a selected heating or cooling unit on if occupant movement is detected and ambient temperature difference exists, and to turn the selected unit off if the room becomes unoccupied. The logic circuit is effective to turn on the heating unit if ambient temperature falls below a preset, low other temperature, even if the room is unoccupied.

9 Claims, 5 Drawing Figures

ROOM TEMPERATURE CONTROL SYSTEM RESPONSIVE TO MOVEMENT BY OCCUPANT AND TO AMBIENT TEMPERATURE

This invention relates to the art of room temperature control systems and more particularly concerns a control system which is responsive to movement by an occupant in the room and to ambient room temperature.

It has been known heretofore to provide a room temperature control device responsive to movement of an occupant in the room. Typical of such a device is one described in U.S. Pat. No. 4,318,508. Some of the prior known devices are capable of automatically modifying the operating temperature limits of a room air heating and cooling unit when the room is unoccupied, and of modifying the operating time of the unit when the room is occupied. The prior devices present a number of disadvantages. They are quite complex and expensive to manufacture and maintain in service. They lack adjustment of response sensitivity to various magnitudes of movement of the room occupant. They do not provide for setting different and independent operational cycles for air heating and air cooling units. They depend for operation on actuation of bimetallic thermostats rather than electronic components to control the heating and cooling apparatus.

According to the invention, there is provided a system in which an adjustable electronic temperature sensor provides an output signal linearly proportional to ambient room temperature. This signal is applied to a pair of signal voltage comparators. A first reference voltage whose magnitude depends on the desired ambient room temperature when the room is occupied is applied to one of the comparators. A second reference voltage whose magnitude depends on the lowest desired ambient room temperature when occupied is applied to the other comparator. Signal outputs of the comparators depend on whether the room is occupied or unoccupied.

The system is further provided with a signal generator which radiates an ultrasonic frequency compressional wave signal in the room where the system is installed. An ultrasonic frequency compressional wave signal receive picks up the ultrasonic signal reflected from an occupant in the room. The reflected signal is applied to a detector circuit which provides a dc output voltage of one level when the room is unoccupied or when no change in received signal frequency due to movement of the occupant is detected. The detector circuit provides a different output dc voltage level when movement of the occupant is detected as indicated by a change in frequency of the received reflected signal. The sensitivity of response of the receiver to the magnitude of movement of the room occupant is adjustable.

The voltage output of the detector circuit is applied to a timer or time delay circuit, which always responds to the last signal received indicating movement of the room occupant to start a new timing cycle. The signal output of the timer is applied to inputs of a logic circuit along with the outputs of the signal voltage comparators. One output of the logic circuit is applied to a heater control relay which turns a space heater unit on and off. The heater unit is turned on when temperature in the room is below a desired, designated or set temperature, and when motion of the room occupant is detected. The heater unit is turned off when the room temperature reaches the designated temperature.

The heating cycle will remain on until a predetermined time after the room becomes unoccupied or after the last motion of the room occupant is detected. The system is sensitive to and responds to even small movements of the occupant while sleeping. After the room becomes unoccupied or no movements of the occupant are detected, and the heating cycle time has expired, the heater relay is activated to turn off the heater unit. This occurs because the other voltage comparator applies a signal to a logic circuit input indicating that the room is unoccupied or that there has been no movement of the room occupant detected for the designated time. An adjustable temperature setting device is connected to one voltage comparator so the desired room temperature can be selected or set by the room occupant. A further temperature adjustment means is connected to the other voltage comparator to set the minimum temperature at which the heating unit will turn on when the room is unoccupied. An air cooling unit control relay is also connected to the logic circuit for turning on the air cooling unit when room temperature rises above a designated or set temperature while the room is occupied. If the room becomes unoccupied or no motion of the room occupant is detected, the control relay for the air cooling unit is actuated to turn the air cooling unit off. A selector switch is connected in circuit with the two relays which control the heater unit and air cooling unit respectively, so that the room occupant can select which unit is to be operable while the other unit remains deactivated.

It is therefore a principal object of the present invention to provide an all electronic room temperature control system which avoids the difficulties and disadvantages encountered with prior control devices such as referred to hereinbefore.

Figure 2:
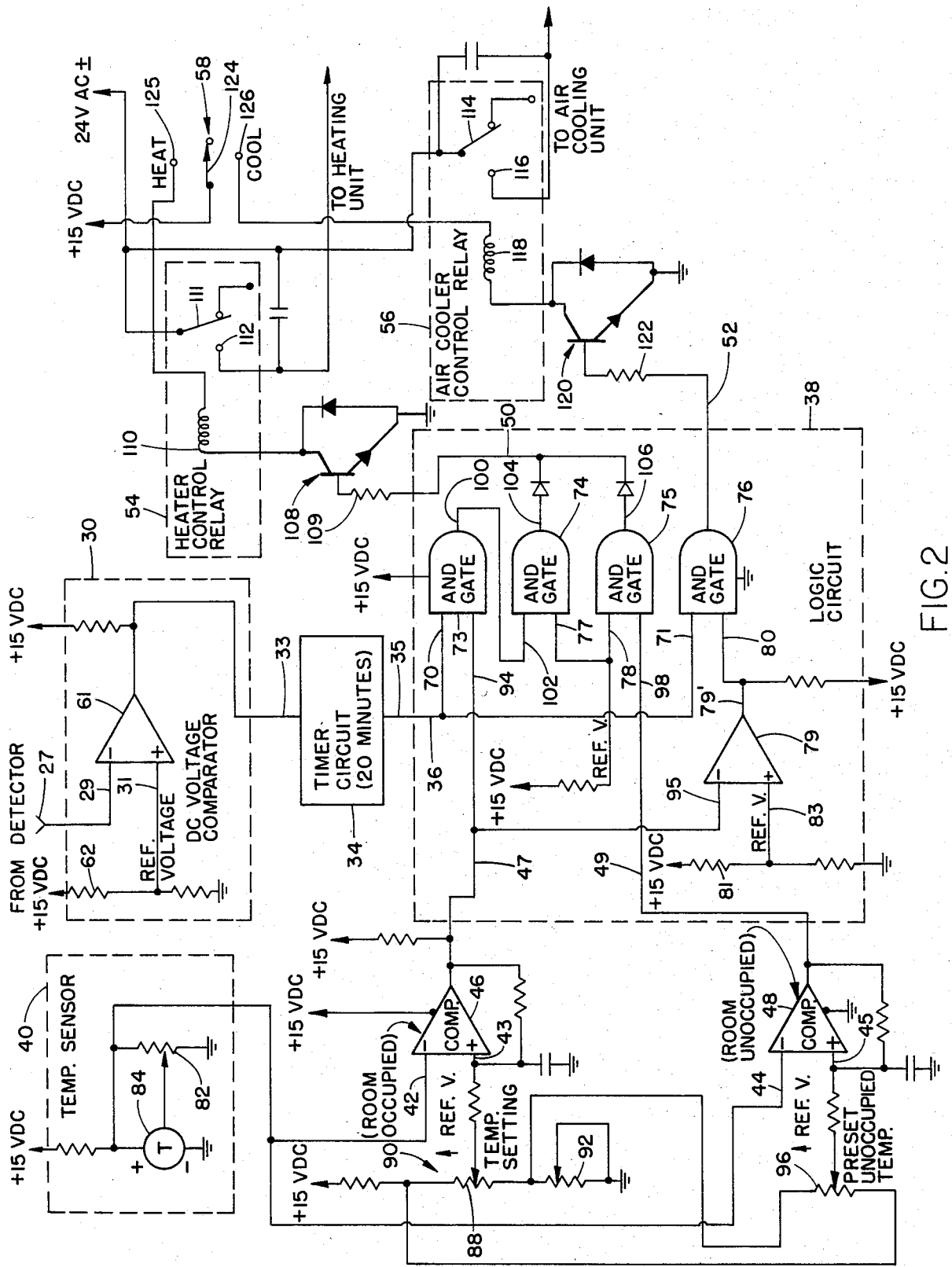
Figure 4:
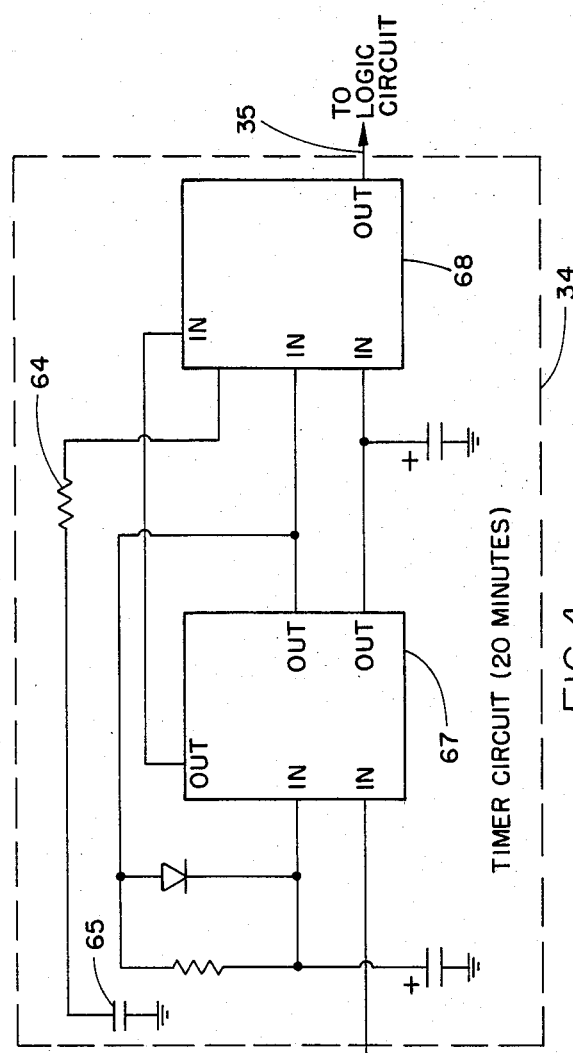
Figure 5:
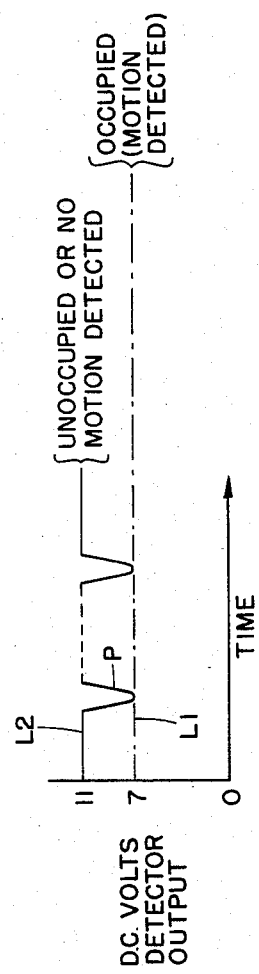
Figure 3:
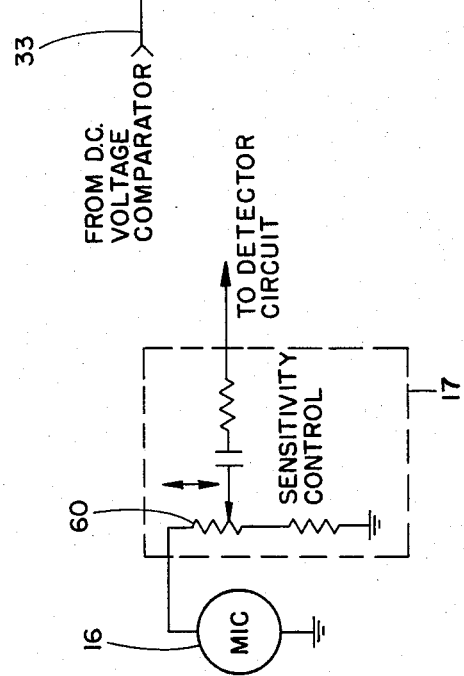

These and other objects and many of the attendant advantges of this invention will be readily appreciated as the same becomes better understood by reference to the following detailed description when considered in connection with the accompanying drawings in which:

FIG. 1 is a block diagram of a room temperature control system embodying the present invention;

FIGS. 2, 3, and 4 are circuit diagrams partially in block format of portions of the control system of FIG. 1; and FIG. 5 is a graphic diagram used in explaining the mode of operation of the invention.

Referring now to the drawings wherein like reference characters designate like or corresponding parts throughout, there is illustrated in FIG. 1, a room temperature control system generally designated by reference numeral 10. An ultrasonic or supersonic frequency signal generator 12 such as a crystal or other oscillator produces an ultrasonic signal continuously at 40 kilohertz, for example. The signal generator 12 drives an ultrasonic frequency radiator or speaker 14 which radiates compressional waves W to impinge on a room occupant 18. The system further includes an ultrasonic microphone or receiver 16 which picks up compressional, ultrasonic frequency waves W' reflected from an occupant 18 in a room, enclosure, or location where the system is installed. The receiver 16 is connected via a sensitivity control 17 to a signal detector circuit 20 which includes a tuner or tuned, circuit 22 tuned to the ultrasonic frequency of the signal radiated by the speaker 14 and picked up by the microphone 16. The output from the tuner 22 is connected via an amplifier 24 having one or more stages of amplification to a detector 26 which produces a dc output voltage. After amplification in an amplifier 28 connected to the detector 26, the dc output voltage is applied to an input 29 of a dc voltage comparator 30 connected to the amplifier 28. A reference dc voltage is connected to an input 31 of the dc voltage comparator 30. The output from the comparator 30 is applied to an input 33 of a timer circuit 34 shown in detail in FIG. 4, and described further below. The output 35 from the timer circuit 34 is connected to an input 36 of a logic circuit 38.

The system further includes an adjustable temperature sensor 40 which senses the ambient temperature of the room or enclosure controlled by the system 10. The sensor 40 may be set to designate the desired temperature in the room when occupied.

The temperature sensor 40 is connected to respective inputs 42, 44 of respective voltage comparators 46, 48. A reference dc voltage source is connected to respective inputs 43, 45 of the respective voltage comparators 46, 48. The voltage comparator 46 is responsive to a condition where there is a moving occupant in the room and the other voltage comparator 48 is responsive to a condition where there is no moving occupant in the room. The outputs from the comparators 46, 48 are connected to inputs 47, 49 of the logic circuit 38.

Outputs 50, 52 from the logic circuit 38 are connected respectively to control relay 54 for a heater unit 55, and to a control relay 56 of an air cooling unit 57. Either control relay may be selected for enabling and/or activation of either unit 55, 57 selector switch 58. The two relays 54, 56, are connected to the heater unit 55 and the air cooling unit 57 for turning them on or off as conditions require.

Referring now to FIGS. 2, 3, and 4 where details of the circuit are shown more specifically, the microphone 16 is shown in FIG. 3 connected to a variable resistor 60 of the sensitivity control 17. This variable resistor 60 makes it possible to adjust the response sensitivity of the system to movements of the room occupant. The sensitivity may be adjusted to respond to movements of an occupant while sleeping, and ignore movements of smaller magnitude of objects, such as fluttering of a curtain or a window blind. The sensitivity control 17 is connected to the input of the tuner 22 of received signal detector circuit 20 as shown in FIG. 1.

A dc voltage output 27 from the detector circuit 20 is connected to the input 29 of an AND gate 61 in the dc voltage comparator 30; see FIG. 2. The dc voltage 27 may have either of two levels L1 or L2 depending on whether the room is occupied or unoccupied as indicated in FIG. 5. A reference dc voltage is applied to comparator input 31 via a voltage dropping resistor 62. The output from the comparator 30 is applied to the input 33 of the timer circuit 34; see FIG. 4. This conventional RC timer circuit has resistor-capacitor components 64, 65 and associated logic components 67, 68 designed to produce a dc voltage output 35 for a predetermined length of time, for example, twenty minutes after a signal pulse is applied by the comparator 30. Each signal pulse from the comparator 30 indicates detection of motion or movement of the room occupant. The timing cycle of timer circuit 34 is restarted each time a pulse is received from the comparator 30 so that the timer circuit 34 is always timing the period from the least detected movement of the room occupant.

The output 34 from the timer circuit 34 is connected via the input 36 to inputs 70, 71 of respective AND gates 73, 75 in the logic circuit 38. A dc reference voltage is connected to inputs 77, 78 of respective AND gates 74 and 75. Another reference voltage is applied via a gate 79 to an input 80 of an AND gate 76 in the logic circuit 38. This reference voltage is applied from a dc voltage source via a resistor 81 connected to an input 83 of the gate 79.

The system has an electronic linear temperature sensor 40 calibrated by a variable resistor 82 connected across a transistor 84; see FIG. 2. The dc voltage output from the temperature sensor 40 is applied to the respective inputs 42, 44 of the respective dc voltage comparators 46, 48. An adjustable resistor 88 in circuit with a reference voltage source 90 is connected to the input 43 of the voltage comparator 46. The resistor 88 serves as a means for designating or setting desired room temperature when the room is occupied. The low end of the adjustable temperature range is settable by means of a variable resistor 92 connected between the resistor 88 and the ground. The output 47 from the comparator 46 is applied to an input 94 of the gate 73 and to an input 95 of the gate 79. The comparator 46 monitors the temperature of the room in association with the sensor 40, when the room is occupied. The comparator 48 has an adjustable resistor 96 connected to the input 45 to provide and set a dc reference voltage depending on the temperature desired in the room when it is unoccupied or no occupant motion is detected in the room. The output 49 from comparator 48 is connected to an input 98 of the gate 75.

An output 100 from the gate 73 is connected to an input 102 of the gate 74. An output 104 from the gate 74 and an output 106 from the gate 75 are connected via a joint output 50 to the input of a transistor 108 via a resistor 109. The output of the transistor 108 is connected to a coil 110 of the heater unit control relay 54. A pair of relay contacts 111, 112 actuate the heater unit 55 as shown in FIG. 1. The air cooler unit 57 is actuated via contacts 114, 116 of the relay 56. These contacts close when a relay coil 118 is energized. The coil 118 is energized via a transistor 120 connected via a resistor 122 to the output 52 of the gate 76. A selector switch 58 has a movable contact or pole 124 movable between a pair of fixed contacts 125, 126. This provides means for selecting the relay 54 for actuation when the heater unit 55 is to be energized or for selecting the relay 56 for actuation when the air cooler unit 57 is to be energized. A dc voltage source is connected to the contact 124. The relays and the heater or cooler units become actuated when the transistor 108 or 120 becomes conductive. By the arrangement described either the heater unit 55 or the cooler unit 57 may be turned on and off depending on the setting of the selector switch 58 and the temperature conditions in the room where the system is installed. A 24 volts ac voltage source is connected to the normally open contacts 11, 114 of the relays to actuate the heater unit 55 and the air cooler unit when the heater control relay 54 or the air cooler relay 56 is energized.

In operation of temperature control system 10, suppose that the room where the system is installed is occupied, that the selector switch 58 is set to HEAT, and that the ambient room temperature sensed by the sensor 40 is less than the temperature setting of the calibrated control 88. This will cause a call for heat indicated by application of a "HIGH" voltage from the comparator 46 to the logic gate 73. When the occupant 18 moves in the room the signal frequency picked up by the microphone 16 changes and is detected by the detector circuit 20 which normally produces a dc output voltage of about eleven volts at level L2; see FIG. 5. The output voltage drops momentarily to about seven volts at level L1 when the applied received signal frequency changes due to movement by the room occupant 18. This momentary drop in voltage is indicated by pulse P in FIG. 5. Each time the occupant 18 moves a pulse P is produced by the detector circuit 20. The pulse is indicative of room occupancy and is applied to the timer 34 which produces a continuous "HIGH" output voltage for the predetermined time period for example, 20 minutes. If the next movement of the room occupant occurs in less than 20 minutes, a new timing period starts when the next pulse P is applied to the timer 34. The "HIGH" voltage from the timer 34 is applied to the gate 73. Since there is coincidence of the "HIGH" voltages at the inputs of the gate 73, a HIGH is produced at the gate 73 output 100 which is applied to the input 102 of the logic gate 74. The reference voltage applied to the input 77 to the gate 74 and the HIGH at the input 102 of the gate 74 cause a HIGH at the output 104. This causes the transistor 108 to fire or become conductive. The coil 110 of the relay 54 becomes energized via the closed contacts 124, 125 of the selector switch 58. The relay contacts 111, 112 close and to apply 24 volts (ac) as a control voltage to turn on the heater unit 55.

After expiration of the predetermined time period (20 minutes) of heating, if no further motion is detected in the room, indicating that it is unoccupied, the detector 20 produces a constant pulse-free output voltage of about 11 volts dc, (level L2 in FIG. 5). In the absence of pulsing, the timer 34 applies a "LOW" signal voltage to the input 70 of the gate 100. A HIGH is still being applied at input 94 of the gate 73. The output 100 from the gate 73 is LOW. The LOW is applied to the input 102 of the gate 74, while a reference voltage HIGH is applied at the input 77 of the gate 74. A LOW is produced at the output 104 of the gate 74, whereupon the transistor 109 becomes nonconductive and heater relay 54 opens contacts 11, 112 to turn off heater unit 55.

While the room is unoccupied, the heater unit remains off. If the room temperature sensed by the sensor 40 falls below the calibrated low temperature setting at the control 96, the comparator 48 will apply a HIGH to the input 98 of the gate 75. This is matched by the reference voltage HIGH applied to the input 78 of the gate 75 and a HIGH will appear at the gate output 106. This HIGH will be applied to the transistor 108, to render it conductive and heater control relay 54 will be actuated to the close contacts 111, 112 and turn the heater unit 55 on.

Suppose now that air cooling is required. The selector switch 58 will be set to COOL by closing the contacts 125, 126, whereby disabling the heater control relay 54 and the heater unit 55 and enables the air cooler control relay 56 to actuate the air cooling unit 57.

Suppose now that the room is occupied and the room temperature sensed by the sensor 40 exceeds the setting of temperature setting control 90. As before the HIGH at the input 42 and the HIGH at the input 43 of the comparator 46 produce a HIGH which is applied to the input 81 of the gate 79. This matches the reference voltage HIGH applied at the gate input 83. A HIGH is produced at the gate output 79' which is applied to the input 80 of the gate 76. The motion of the room occupant causes application of a frequency change to the detector circuit 20 which produces a pulse P to actuate timer circuit 34. The timer output applies a HIGH to the input 71 of the gate 76. A high appears at the gate output 52 and the transistor 120 is rendered conductive to energize the air cooler unit 57 is actuated.

If the room should become unoccupied a LOW will be applied at the input 71 from the timer circuit 34, causing a LOW at the output 52, thereby turning off the transistor 120 and de-energizing the relay coil 118 to open the contacts 114, 116 and turn off the air cooling unit 57.

It will be noted that the room occupant need only be concerned with setting the calibrated temperature control 88. The Control 96 is preset for unoccupied conditions. The control 17 is preset for desired sensivitity to motion by the room occupant. The control 82 is preset to calibrate the sensor 40. Operation of the system is entirely automatic which results in economy of energy consumption. Heating and cooling stop when the room becomes unoccupied. While the room is unoccupied, the air cooking unit never goes on but the heater unit goes on if the ambient room temperature falls below the allowable lower limit set by the temperature setting control 96. Then the heater unit is turned off when the room temperature rises to the preset low temperature, while the room is unoccupied.

It should be understood that the foregoing relates to only a preferred embodiment of the invention which has been by way of example only, and that it is intended to cover all changes and modifications of the examples of the invention herein chosen for the purpose of the disclosure which do not constitute departures from the spirit and scope of the invention.

What is claimed is:

1. A temperature control system for a room in which ambient air temperature is selectively elevated by a space heating unit and lowered by an air cooling unit, comprising:
   relay control means for turning said heating unit on and off;
   signal generating means for continuously radiating a signal of fixed frequency in said room;
   signal receiving means adapted to pick up said radiated signal after reflection of the same from an occupant in said room;
   signal detector means connected in circuit with said signal receiving means and arranged to generate an output signal responsive to a change in frequency of said reflected signal upon each movement of said occupant in said room;
   timing means connected in circuit with said signal detector means and arranged to generate a timing signal for a fixed time period after each one of said output signals is applied to said timing means;
   air temperature sensing means arranged to generate another signal responsive to ambient air temperature in said room;
   temperature setting means arranged to generate reference signal corresponding to a desired ambient air temperature in said room when occupied by said occupant;
   signal comparison means connected in circuit with said temperature sensing means and said temperature setting means for generating control signals responsive to differences in magnitude between said reference signal and said other signal; and logic circuit means having inputs connected in circuit with said signal comparison means and said timing means, and having an output connected to said relay control means, said logic circuit means being arranged to actuate said relay control means to turn said heating unit on and to keep said heating unit on, and to actuate said relay control means to turn said heating unit off, upon expiration of said fixed time period following the last detection of movement of said occupant in said room.

2. A temperature control system as defined in claim 1, further comprising adjustable sensitivity response means connected in circuit with said signal receiving means, to set the desired minimum magnitude of said movement by said occupant to which it is desired that said signal detector means responds.

3. A temperature control system as defined in claim 1, wherein said signal generating means and said signal receiving means are arranged for respectively radiating and picking up compressional waves.

4. A temperature control system as defined in claim 3, wherein said fixed frequency is an ultrasonic frequency.

5. A temperature control system as defined in claim 1, wherein said logic circuit means is further arranged to turn on said heating unit when movement of said occupant first occurs and the temperature of ambient air in said room is below said desired temperature, to continue heating air in said room while said occupant moves in said room and temperature of ambient air in said room remains below said desired temperature, to continue heating air in said room for a predetermined time after the last movement of said occupant in said room ceases while the temperature of ambient air in said room remains below said desired temperature, and to turn off said heating unit at the end of said predetermined time period.

6. A temperature control system as defined in claim 1, further comprising other temperature setting means arranged to generate a reference signal corresponding to a predetermined other ambient air temperature lower than said desired ambient air temperature both when said room is unoccupied and when no movement of said occupant is detected in said room; and further signal comparison means connected in circuit between said other temperature setting means and said logic circuit means for actuating said relay control means to turn said heating unit on when the ambient air temperature in said room falls below said predetermined other temperature even though said room is unoccupied, and to turn said heating unit off when the ambient air temperature in said room rises above said predetermined other temperature while said room is unoccupied.

7. A temperature control system as defined in claim 1, further comprising other relay control means for turning said air cooling unit in said room on and off, said other relay control means being connected in circuit with another output of said logic circuit means, said logic circuit means being futher arranged to turn said air cooling unit on when movement of said occupant in said room first occurs, to keep said air cooling unit turned on as long as said occupant moves in said room, and to turn said air cooling unit off when movement of said occupant in said room ceases.

8. A temperature control system as defined in claim 7, further comprising selector switch means connected in circuit with the first named and said other relay control means and actuatable to enable either relay control means while disabling the remaining relay control means, so that said heating unit is operable while said air cooling unit is turned off and vice versa.

9. A temperature control system as defined in claim 7, wherein said logic circuit is further arranged:
to keep said air cooling unit turned off regardless of the temperature of ambient air in said room;
to turn on said heating unit when movement of said occupant in said room first occurs and temperature of air in said room is below said desired temperature;
to continue heating air in said room while said occupant moves in said room and temperature of ambient air in said room remains below said desired temperature;
to continue heating air in said room for a predetermined time after the last movement of said occupant in said room ceases while the temperature of ambient air in said room remains below said desired temperature; and
to turn off said heating unit at the end of said predetermined time period.

* * * * *